Sept. 20, 1960 R. KOLL 2,953,639
APPARATUS FOR AUTOMATICALLY ADJUSTING THE
OPERATION OF A FACSIMILE TRANSMITTER
Filed Nov. 4, 1955

Inventor:
Roman Koll
By [signature] Atty.

2,953,639

APPARATUS FOR AUTOMATICALLY ADJUSTING THE OPERATION OF A FACSIMILE TRANSMITTER

Roman Koll, Heikendorf, Kiel, Germany, assignor to Dr. Ing. Rudolf Hell, Kiel-Dietrichsdorf, Germany, a German firm Filed Nov. 4, 1955, Ser. No. 545,084

Claims priority, application Germany Jan. 12, 1955

6 Claims. (Cl. 178—7.2)

Figure 1:
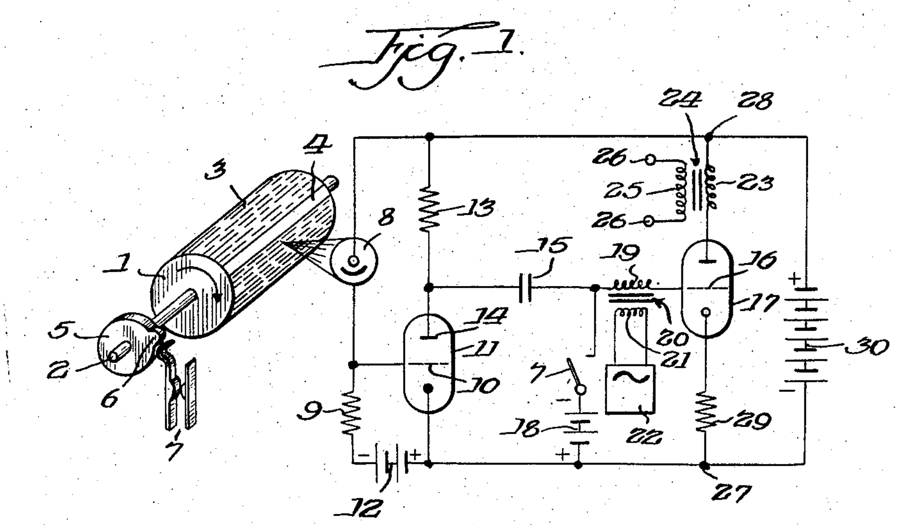

This invention relates to apparatus for the automatic adjustment of the white level of a facsimile transmitter.

Numerous control circuits are known for use in facsimile transmitters for the electric transmission of unshaded line pictures, drawings, printed material or the like, by photoelectric scanning of the corresponding matter along successive scanning lines.

Since unshaded matter is concerned, for instance, written or typed matter, either the black values of the type or the white values of the background are transmitted in the form of alternating current pulses of constant amplitude which control in the receiver a printing device for the positive or negative recording of the type.

The transmission of pulses is generally effected by opening or closing a scanning stage by the picture signals amplified in an amplifier stage, whereby alternating current pulses are fed to the transmission line.

In the transmission of documents and the like, the brightness of the background may differ greatly; depending on what paper is used, it may vary between a very bright white and a dark gray, from which the still darker written matter is just about recognizable.

The amplifier of the facsimile transmitter must however be adjustable to any initial white value of the background occurring at the start of the transmission in order to determine the corresponding initial electric white level so that it can be on the one hand definitely cut off at the adjusted white value responsive to scanning white during the transmission and on the other hand definitely open when scanning a black element because there would otherwise arise the danger of triggering the amplifier incident to the scanning on the scanning drum of the background which is not provided with written matter or the like.

Customarily, this adjustment to the white value of a document carrying the written matter or the like is effected manually by means of a potentiometer prior to the transmission, for instance by regulating the negative grid bias of a scanning stage in accordance with the plate voltage of a photoelectric cell amplifier according to the white value of the background of the document, by scanning a part of the document clamped onto the picture drum which is free of type, and controlling such adjustment by means of a measuring instrument or another suitable indicating device.

This adjustment is cumbersome and time consuming, particularly when several documents having different background brightness are to be successively transmitted, thus requiring each time a resetting of the white value. Furthermore, the adjustment of the white value prior to the transmission may be nullified during the transmission by alternation of the amplification of the photoelectric cell amplifier as a result of variations in operating voltage or for other reasons. In order to make an amplifier stable, measures such as the stabilization of the operating voltages and use of negative feedbacks are, as is known, necessary. In order to circumvent these difficulties, the beam of light which scans the picture is interrupted periodically so as to obtain a carrier frequency which can be better controlled from the standpoint of amplifier technique. However, for a small facsimile transmitter which is to be operated in simple manner, devices of the above mentioned type are not feasible either with respect to space requirements or costs so that it would appear desirable, particularly for the purpose of simplifying operation, to be able to employ a control device comprising comparatively simple circuit means for automatically adjusting or setting the operation in accordance with the white value of the document to be transmitted while at the same time avoiding uncontrollable variations in amplification.

In accordance with the invention, the above indicated objects are realized by the use of a transmitting circuit comprising an amplifier tube cooperating with a photoelectric cell and followed by a keying tube, with means for coupling the grid of the keying tube by way of a capacitor with the plate of the amplifier tube, and singly or periodically recurring brief scanning of the brightness of the blank area of the document, that is, for example, the area on which there is no written or typed matter, and simultaneously connecting a voltage source to the grid of the keying tube for the purpose of periodically charging the coupling capacitor to the plate voltage of the amplifier tube corresponding to the white values scanned. The keying tube operating with a given constant grid bias is thereby caused to cut off definitely independent of the absolute value of the plate potential so long as the white value is being scanned and to continue at cut off when the light spot leaves the area being scanned when the voltage source is again disconnected from the capacitor. The anode potential of the amplifier tube and thus the grid potential of the keying tube increase only when the light spot encounters a darker element.

Figure 2:
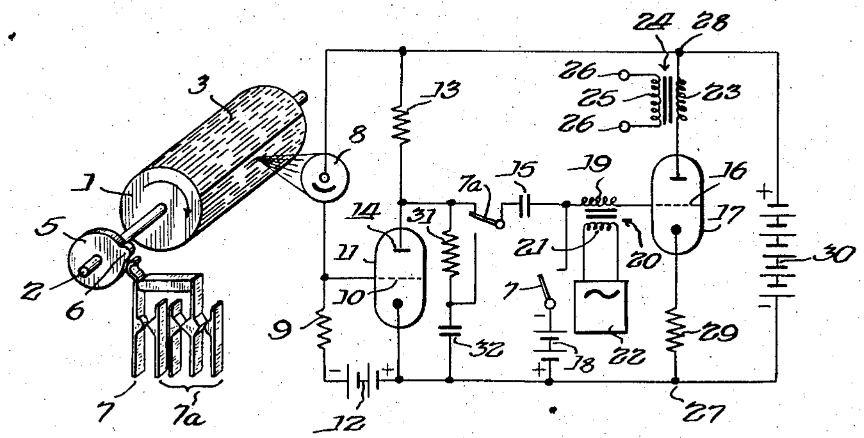

For the further explanation of the invention, two embodiments are shown schematically in the accompanying drawing wherein Fig. 1 shows a transmitter circuit for the control of a facsimile transmitter comprising a capacitor for connecting the grid of the scanning tube with a plate of the photocell amplifier tube; and Fig. 2 shows a modified circuit, in which, in addition to the capacitor, there is also provided an RC element.

Referring to Fig. 1, the picture or carrier drum 1 is rotated about the shaft 2 by a motor (not shown). The copy matter 3, document or the like, which is to be transmitted and does not bear any writing within a narrow strip 4, is clamped onto the drum 1. To the drum shaft 2, there is fastened a cam 5 having a rise 6 which is aligned with the longitudinally extending blank strip-like area 4. Upon each rotation of the drum 1, the cam rise 6 closes a contact 7 for a brief interval. A scanning device (not shown) which carries out a feed motion relative to the surface of the drum parallel to the axis of the drum, scans the copy 3 helically by means of a light spot projected through the aperture of a shutter. The light reflected from the surface of the copy falls onto a photoelectric cell 8 which produces a photoelectric current proportional to the brightness scanned. Numeral 9 indicates a resistor cooperating with the photoelectric cell, such resistor functioning at the same time as a grid leak resistor for the direct current amplifier tube 11, a voltage drop being produced at such resistor which is proportional to the photoelectric current and this drop being imparted to the grid 10 of the amplifier tube 11. Numeral 12 indicates a voltage source for producing a negative grid bias for the tube 11, and 13 is the plate resistor of this tube. The grid 16 of the keying tube 17 is coupled to the plate 14 of the amplifier tube by way of a capacitor 15. The grid 16 of tube 17 and the capacitor 15 may be connected, on the grid side by way of the contact 7, with the negative terminal of the voltage source 18 which serves to produce a negative grid bias for the tube 17. In the conductor extending to the grid of this tube there is disposed the secondary winding 19 of a transformer 20, the primary winding 21 of which is connected to an A.C. generator 22 producing a carrier frequency which is thus inductively superimposed on the signal grid voltage of the keying tube 17. In the conductor extending from the plate of the keying tube 17, there is disposed the primary winding 23 of a transformer 24, the secondary winding 25 of which delivers the scanned carrier frequency pulses to the terminals 26 of a transmission line. 29 is a cathode resistor which serves to limit the plate current of tube 17 in case of overmodulation. To the terminals 28 and 27, there is connected the operating voltage source 30 which supplies the driving potential for the photoelectric cell 8 and the plate operating potentials for tubes 11 and 17.

After each revolution of the drum, when the scanning spot is just scanning the basic brightness (white value) of the blank strip-like area 4, the contact 7 is closed by the cam rise 6 and the grid 16 and capacitor 15 are accordingly connected with the grid voltage source 18 and is charged at a voltage corresponding to the sum of the plate voltage of tube 11 and the constant voltage of the source 18 which delivers the grid bias for the keying tube 17. A relatively low plate voltage is produced at the plate 14, which voltage corresponds to the brightness of the blank portion 4 of the copy 3. The grid 16 receives in this manner from the source 18 a grid bias of such a value that the keying tube 17 definitely cuts off during the scanning of the brightness of the blank portion. If another copy having a blank portion of different brightness, for instance a darker one, is scanned, a different, for instance higher, plate potential will occur at 14, corresponding to the different white background value, as a result of which the capacitor 15 is charged to a different, for instance, higher voltage while the grid bias of the keying tube 17 remains unchanged, and this tube will therefore always cut off regardless of the basic brightness of the blank area of the copy that is being processed. As a matter of fact, even if the document to be transmitted were black, the scanning tube would cut off.

When, upon the continued rotation of the drum, the scanning spot leaves the blank strip 4, the cam rise 6 opens the contact 7, as a result of which the grid voltage source 18 is disconnected from grid 16 and from the capacitor 15. The capacitor 15 however retains in this manner its charge and thus its potential unvaried and the potential at the grid of tube 17 will not change so long as a portion of the copy is being scanned the brightness of which corresponds to that of the blank area.

Now, when upon the further rotation of the drum the light spot scans a darker element, the photoelectric current and thus also the signal voltage at the grid 10 of the amplifier tube 11 will drop. The plate current of such tube becomes smaller and the voltage drop at 13 less so that the plate potential at 14 rises. Since the capacitor 15 retains its charge and thus its voltage unchanged after the opening of the contact 7, the potential at grid 16 of the keying tube 17 increases by the same amount as at the plate 14. The tube 17 is in this manner triggered and plate current flows therein. The grid direct voltage is superimposed upon alternating voltage and amplified alternating voltage pulses which are transmitted to the transmission line 26 are accordingly produced in the output transformer 24. The potential leap at the grid 16 may be rather considerable corresponding to the different contrast of the copy elements with respect to the blank portions thereof, and the cathode resistor 29 is for this reason provided which produces a linearization of the characteristic and a coupling for limiting the plate current and preventing overmodulation of tube 17.

When upon further scanning, a bright spot of the copy is again encountered by the light spot, the former state again recurs, namely, the plate current in the amplifier tube 11 rises, the potential at 14 and thus also the voltage at grid 16 drop, and as a result, the keying tube 17 again cuts off.

A single charging of the capacitor 15 upon the scanning of the blank or white strip at the beginning of the transmission would suffice if during the transmission, the capacitor 15 would retain its charge unchanged and the operating data of the amplifier tube 11 would not change. As a result of insufficient insulation of the capacitor, however, the capacitor charge may slowly level out, and as a result of variations in the operating voltages, the amplification of tube 11 may slowly vary, and the white potential at the plate 14 might accordingly be changed during the transmission. It could then happen that upon scanning white, tube 17 would be already open and the receiver would begin to print, or else that the tube would remain at cut-off when scanning black. Therefore, the above described correction of the white value is periodically repeated, namely, once upon each revolution of the drum. For this purpose there is provided the narrow blank test strip-like area joining the ends of the document to be transmitted.

A variant of the circuit arrangement is shown in Fig. 2. Corresponding circuit elements bear the same reference numerals as in Fig. 1. In this arrangement, the requirement that a test strip of the document remain blank is dispensed with. It is assumed that the mean brightness of a sheet covered with writing is only slightly less than the brightness of such sheet when blank since the parts of the surface of the corresponding document which are blank customarily predominate over the parts which are written on. In order to utilize this fact for the automatic adjustment and correction of the white value, an RC member 31, 32 having a large time constant is connected in Fig. 2 in parallel to the amplifier tube 11. During the scanning, the capacitor 32, which must be large as compared with the capacitor 15, is charged by way of a very high resistance of resistor 31 and due to the large time constant assumes the mean potential of the plate 14 which corresponds to the mean brightness of the blank parts of the document containing the writing. The capacitor 32, therefore, serves to store the mean plate potential of tube 11 corresponding to the mean brightness of the blank parts of the document written-on. This mean potential, in accordance with what has been stated above, is only slightly above the potential corresponding to the white value of the document sheet in its blank condition. The grid bias of tube 17 is in such case of a magnitude that the tube cuts off despite this somewhat increased potential. During the scanning of the document, the manner of operation of the capacitor 15 is the same as described in connection with Fig. 1 except, of course, that the capacitor 15 is charged at a voltage corresponding to the sum of the mean voltage charge stored in the capacitor 32 and the grid bias source 18. The plate potential of the amplifier tube 11 and thus the grid potential of the keying tube 17 vary abruptly, corresponding to the signals "white" and "black," between low and high values, as a result of which the tube 17 alternately cuts off and opens and transmits during opening alternating current signals to the transmission line.

The charge of the capacitor 15 is in this case also corrected in a periodically recurring manner, preferably after each revolution of the drum, in order to compensate for variations in amplification of tube 11. For this purpose, there are provided two contacts 7 and 7a which are actuated for brief intervals by the cam rise 6 after each revolution of the drum. During these intervals, the grid 16 and the capacitor 15 are connected by contact 7 on the grid side with the voltage source 18 and capacitor 15 is connected on the plate side by contact 7*a* with capacitor 32, as a result of which the capacitor 15 assumes the average white potential of plate 14 stored in 32.

Changes may be made within the scope and spirit of the appended claims.

I claim:

1. In a facsimile transmitter adapted for the transmission of generally black-white copy matter of the class consisting of drawings and legible matter including documents and the like, wherein the matter to be transmitted appears upon carriers of different brightness representing in the transmission of the respective copies the white level at which transmission of copy element signals is to be cut off and having a photocell amplifier stage including photocell means for scanning a copy to be transmitted and a direct current amplifier tube for amplifying the signals ascertained by said scanning and representing copy elements to be transmitted, and further having a keying stage comprising a keying tube for keying element signals received from said amplifier stage to modulate a carrier frequency for the transmission of said element signals; a device for automatically controlling said keying tube to cut-off upon scanning by said photocell means of blank portions of said copy, said device comprising circuit means including a capacitor for interconnecting the plate of said amplifier tube with the grid of said keying tube, a bias voltage source in effective series with the plate voltage source of said amplifier tube and of a potential to cut off said keying tube, and control means effective during scanning at a white level for briefly connecting the negative pole of said bias voltage source to a point between the grid of said keying tube and said capacitor whereby the charge on the latter is the sum of the resulting plate voltage of said amplifier tube and that of said bias voltage source and operative to maintain the keying tube in a cut-off condition until the plate voltage of said amplifier tube increases and the bias on said keying tube correspondingly decreases to effect conduction of the latter.

2. Apparatus according to claim 1, wherein said copy the contents of which are to be transmitted is mounted on a rotatable drum, said copy containing a blank portion which is initially scanned to effect charging of said capacitor as specified.

3. Apparatus according to claim 2, comprising means controlled by the rotation of said drum for actuating said control means always during the scanning of said blank portion of the copy carried by said drum.

4. Apparatus according to claim 3, comprising contact means constituting said control means, and cam means controlled by the rotation of said drum for actuating said contact means.

5. Apparatus according to claim 1, wherein said copy the contents of which are to be transmitted is mounted on a drum, comprising an RC-element connected in parallel to said amplifier tube for storing the mean plate voltage thereof which corresponds to the mean brightness of the blank portions of said copy, further control means for periodically disconnecting said capacitor from the plate of said amplifier tube and connecting it to the capacitor of said RC-element, and means controlled by the rotation of said drum for simultaneously actuating said first named control means and said further control means.

6. Apparatus according to claim 5, comprising contact means respectively constituting said first named and said further control means, and cam means controlled by the rotation of said drum for actuating said contact means always incident to the scanning of the copy seam of said copy mounted thereon.

References Cited in the file of this patent

UNITED STATES PATENTS

| | | |
|---|---|---|
| 1,690,300 | Horton | Nov. 6, 1928 |
| 1,695,048 | Ives | Dec. 11, 1928 |
| 1,743,856 | Ives | Jan. 14, 1930 |
| 1,865,646 | Shroter et al. | July 5, 1932 |
| 2,302,425 | Deerhake | Nov. 17, 1942 |
| 2,347,015 | Woloschak | Apr. 18, 1944 |
| 2,554,317 | Tolson | May 22, 1951 |
| 2,804,497 | Eliot | Aug. 27, 1957 |